United States Patent [19]

Nishioka et al.

[11] 3,915,919

[45] Oct. 28, 1975

[54] GYPSUM COMPOSITION

[75] Inventors: Akinori Nishioka; Mitsuhiko Sakakibara, both of Yokohama; Akio Itabashi, Kawasaki; Koei Komatsu, Tokyo, all of Japan

[73] Assignee: Japan Synthetic Rubber Co., Ltd., Tokyo, Japan

[22] Filed: Nov. 2, 1973

[21] Appl. No.: 412,087

[30] Foreign Application Priority Data
Nov. 6, 1972 Japan................ 47-110974

[52] U.S. Cl. ...... 260/29.6 S; 260/29.6 BM; 260/38; 260/42.13; 260/844; 106/90
[51] Int. Cl.².......................................... C08L 29/04
[58] Field of Search....... 260/38, 844, 42.13, 29.6 S

[56] References Cited
UNITED STATES PATENTS

| | | | |
|---|---|---|---|
| 2,462,252 | 2/1949 | Booty.............................. | 260/844 X |
| 2,890,948 | 6/1959 | Fartl et al. ....................... | 260/844 X |
| 3,240,736 | 3/1966 | Beckwith .......................... | 260/38 X |
| 3,433,701 | 3/1969 | Armour ........................... | 260/844 X |
| 3,434,997 | 3/1969 | Schmoll .......................... | 260/844 X |
| 3,617,429 | 11/1971 | LeBlanc........................... | 260/844 X |

*Primary Examiner*—Donald E. Czaja
*Assistant Examiner*—S. M. Person
*Attorney, Agent, or Firm*—Ladas, Parry, Von Gehr, Goldsmith & Deschamps

[57] ABSTRACT

A gypsum composition obtained by molding and drying an aqueous slurry comprising calcined gypsum, at least one polyvinyl alcohol, at least one thermosetting resin and at least one metal compound is excellent in wet strength and wet hardness when immersed in water.

20 Claims, No Drawings

GYPSUM COMPOSITION

This invention relates to a gypsum composition and, more particularly, to an improvement in water resistance and surface hardness of the gypsum composition comprising gypsum, polyvinyl alcohol (hereinafter referred to as PVA), a thermosetting resin, and a metal compound.

In recent years, molded articles of gypsum, particularly gypsum board and the like, manufactured by hardening of gypsum have been in increased demand as building materials because of their superiority in flame resistance, sound absorption, heat insulation, dimensional stability, and processability. On the other hand, however, insufficient surface hardness and inferior water resistance have restricted the use field of gypsum products.

Many attempts have long been made to make gypsum lighter in weight or higher in strength by addition of high molecular weight compounds or fibrous materials. It has been known, for example, that when calcined gypsum is hardened with an aqueous solution of PVA added thereto as hydrating solution, the dispersion of PVA is good and the hardened product is improved to some degree in surface hardness and in strength, owing to the good film-forming ability of PVA (French Pat. No. 1,013,252). The product, however, has disadvantages in that water resistance is too low and surface hardness is still insufficient for practical use. The present inventors have made an effort to overcome such disadvantages and, as a result, have found that a gypsum composition having an increased strength and improved water resistance can be obtained without losing the merits of the addition of PVA by crosslinking the PVA within the gypsum with the aid of a metal compound. When the above gypsum composition is immersed in water, however, it is swollen up, the gloss is lost and the surface hardness is greatly reduced. Therefore, it cannot be said that the above gypsum composition is sufficient in practical use.

The present inventors have further found that by using, in addition to PVA, a thermosetting resin such as melamine-formaldehyde resin or urea-formaldehyde resin and crosslinking the same together with PVA with the aid of a metal compound, it is possible to further improve the molded gypsum products in strength and water resistance even when the thermosetting resin and the PVA are added in small amounts, and in particular, on immersion in water the swell-up phenomenon is no longer recognizable and the surface hardness is improved.

According to this invention, there is provided a gypsum composition characterized by obtaining the same by molding and drying an aqueous slurry comprising (1) calcined gypsum, (2) at least one polyvinyl alcohol, (3) at least one thermosetting resin, and (4) at least one metal compound other than calcium sulfate.

The term "polyvinyl alcohol" used herein means polymers containing vinyl alcohol units in the molecule. Preferably, the polymers contain 50 mole % or more of vinyl alcohol units in the molecule. The polymers include homopolymer, copolymers and graft-polymers. Specifically, the polyvinyl alcohol includes saponification products of polyvinyl acetate, formate, propionate, etc., having a degree of saponification of at least 50 mole %; saponification products of copolymers of vinyl formate, acetate or propionate and vinylic monomer copolymerizable therewith, such as acrylonitrile, acrylic acid, maleic anhydride, methyl methacrylate, 2-hydroxyethyl acrylate, glycidyl methacrylate, or the like, having a saponification degree of at least 50 mole %; acetalized saponification products of polyvinyl acetate, formate or propionate, having a degree of sapnification of at least 50 mole %, the degree of acetalization of which is up to 15 mole percent; and graft-polymers of a vinylic or conjugated diene monomer on saponification products of polyvinyl formate, acetate or propionate having a degree of saponification of at least 50 mole percent, examples of the vinylic or conjugated diene monomers being acrylonitrile, acrylic acid, methyl methacrylate, 2-hydroxyethyl acrylate, glycidyl methacrylate, chloroprene or the like, and the amount thereof being up to 5 moles per mole of the vinyl alcohol unit in the saponification product. The above-mentioned polymers may be used alone or in admixture of two or more.

The amount of PVA may vary depending upon the degree of polymerization and the degree of saponification thereof, and is usually from 0.1 to 50 parts by weight, preferably 0.5 to 20 parts by weight, per 100 parts by weight of calcined gypsum.

Suitable thermosetting resins are condensation products of melamine and formaldehyde, those of urea and formaldehyde, those of phenol and formaldehyde, those of a guanamine and formaldehyde, and derivatives of these condensation products. These resins may be used alone or in admixture of two or more. A wide range of these resins from pre-condensation products to reticular polymers are used. The pre-condensation products are employed generally in the form of an aqueous solution, and the reticular polymers in the form of a suspension or emulsion. Although the amount of the thermosetting resin used may be varied freely in accordance with the properties of the intended gypsum composition, it is generally 0.1 to 50 parts by weight, preferably 0.5 – 20 parts by weight per 100 parts by weight of calcined gypsum.

The metal compounds for use in this invention, which easily form a chelate bond with the hydroxyl group in the PVA, may be used alone or in admixture of two or more, and are, for example, compounds of metals of Groups Ib, II, IIIa, IV, Vb, VIb, VIIb, and VIII of the Periodic Table. Examples of the metals for use are Cu, Ag, and Au as Group Ib; Be, Mg, Ca, Sr, Ba, Zn, Cd, and Hg as Group II; Al as Group IIIa; Si, Sn, Pb, Ti, and Zr as Group IV; V and Nb as Group Vb; Cr, Mo, and W as Group VIb; Mn as Group VIIb; and Cu, Mg, Zn, Al, Si, Sn, Ti, Zr, V, Gr, Mo, Mn, Fe and Ni are preferably used in this invention. In view of pollution and color of the composition, Mg, Ca, Al, Si, Sn and Ti are most preferable. Compounds of these metals include sulfates, nitrates, carbonates, acetates, halides, hydroxides, oxides, and so on. Examples of individual compounds are copper acetate, copper nitrate, copper sulfate, copper bromide, copper iodide, magnesium iodide, calcium acetate, strontium nitrate, barium oxide, zinc chloride, zinc acetate, cadmium fluoride, mercuric acetate, aluminum chloride, aluminum sulfate, silicon oxide, stannous chloride, stannic chloride, stannous sulfate, lead acetate, titanium sulfate, titanium hydroxide, zirconium oxychloride, vanadium trichloride, vanadium pentoxide, niobium chloride, chromous chloride, potassium bichromate, molybdenum oxide, tungstic acid, manganese chloride, manganese dioxide, manganese acetate, ferrous chloride, ferric chloride, ferric nitrate, cobaltous sulfate, cobalt acetate, nickel chloride, and nickel acetate. (Calcium acetate, magnesium iodide, aluminium chloride, aluminum sulfate, silicon oxide, stannous chloride, stannic chloride and titanium sulfate are particularly preferable.

When the metal compound itself is not watersoluble, it can be used either in the form of a suspension or after having been made water-soluble by the addition of an inorganic acid such as hydrogen halide, sulfuric acid, or nitric acid; an organic acid such as a carboxylic acid, for example, formic acid, or chloroacetic acid, or an organic sulfonic acid, for example, benzenesulfonic acid or p-toluenesulfonic acid; or an amine such as ammonia, pyridine or an alkyl derivative thereof, pyrrole or an alkyl derivative thereof, triethylenediamine, dimethylamine, or diethylamine. The above-mentioned metal compounds easily form a chelate with the hydroxyl group in the PVA, and cross-link the PVA and the thermosetting resin to cure the resins.

Acids act, in most cases, to adjust the start and the rate of the crosslinking reaction of PVA with a metal compound. Amines are coordinated with the metal to enhance the solubility of the metal compound in water. Therefore, the time required for crosslinking can be controlled by the quantity of an acid or amine added.

The amount of the metal compound necessary to manifest effectively the said reaction in the composition of this invention is within the range of 0.001 to 1 mole, preferably 0.004 to 0.1 mol per one hydroxy group in PVA.

The amount of water added may be the same as used in producing an ordinary cast gypsum, that is 50 to 120 parts by weight per 100 parts by weight of calcined gypsum. The amount of PVA which can be added varies depending on the amount of water added.

A gypsum composition which is excellent in strength, improved in surface hardness, and resistant to penetration of water, and particularly excellent in net strength and wet hardness when immersed in water, can be obtained by adding an aqueous solution or suspension of at least one metal compound other than calcium sulfate (said aqueous solution or suspension may be either acidic or alkaline) together with calcined gypsum to a mixed aqueous solution, suspension, or emulsion of PVA and at least one thermosetting resin, or alternatively, adding an aqueous solution or suspension of at least one metal compound other than calcium sulfate (said aqueous solution or suspension may be either acidic or alkaline) to a mixed aqueous solution, suspension or emulsion of PVA and at least one thermosetting resin and then adding calcined gypsum to the resulting mixture, to form a viscous slurry, pouring the slurry into a desired mold and then allowing the slurry to solidify into a molded article.

Polymer latexes, such as SBR latex, NBR latex, natural rubber latex, polyvinyl acetate latex, ethylenevinyl acetate copolymer latex, polyvinyl chloride latex, polystyrene latex, their carboxyl-containing polymer latexes, may be added alone or in admixture of two or more to the aqueous slurry of this invention to improve compressive strength, and nail- and wood screw-holdability. The amount thereof is preferably 0.1 to 50 parts by weight, more preferably 0.5 to 20 parts by weight, per 100 parts by weight of the calcined gypsum.

By adding to the aqueous slurry of this invention synthetic fibers such as rayon, Vinylon, Nylon, and polypropylene, natural fibers or cellulose such as cotton and pulp, or mineral fibers such as glass and asbestos, it is possible to further improve the flexural strength and impact resistance of the composition and to obtain a foamed and light-weight product thereof without detracting from the merits of this invention. These fibrous materials give a maximum strength when added in an amount of 0.5 to 10, preferably 1 to 5 parts by weight per 100 parts by weight of calcined gypsum.

Density reduction of the gypsum composition can be effected either by foaming of PVA itself, or by addition of density-reducing materials such as foamed polystyrene beads, "Shirasu" ($SiO_2$ 65 – 73 % by weight, $Al_2O_3$ 12 – 18 % by weight, $K_2O$ 5 – 7 % by weight) balloon, perlite and wood flour. Addition of "Shirasu," glass powder, clay or PVA powder increases the strength of the composition. Other materials such as a filler may be added without deteriorating the strength of the composition. By incorporation of pigments or dyes, the gypsum composition of this invention becomes usable as decorative materials. The amount of the density-reducing material or filler added is 0.5 to 200, preferably 1 to 100, parts by weight per 100 parts by weight of calcined gypsum.

The gypsum composition of this invention may be used as a building material and a decorative material. When used in the form of a so-called gypsum board as a ceiling board or a wall board for the purposes of sound absorption and fire-proofing, the shaped articles obtained from the composition of this invention have an advantage in that they need not be overlaid with paper on either side, as with conventional gypsum boards, and can be used as produced.

The invention is further illustrated below in detail with reference to Examples, but the invention should not be understood to be limited to the Examples.

In the Examples, the testing of physical properties of the gypsum composition was carried out in the following way: A test specimen was prepared by drying a solidified shaped article in an air stream at 60°C. for 48 hours, and then keeping the dried article at 20°C. and 45 to 55 % relative humidity for 2 days or more. The testing for flexural strength and compressive strength was carried out according to JIS R 5201. Izod impact strength was tested on a test piece of $1.27 \times 1.27 \times 6.35$ cm (unnotched). Following the procedure of JIS-K 5401, pencil hardness was expressed as the minimum hardness of a pencil which can scrape off the surface of the gypsum composition. The testing was conducted with pencils of 9H to 6B by use of a pencil scratch tester ("9H" shows the maximum hardness and "6B" the minimum hardness).

EXAMPLE 1

In 500 ml of water were dissolved 10 g of PVA having a degree of polymerization of about 1,500 and a degree of saponification of about 86 % and 5 g (solids) of a melamine-formaldehyde pre-condensation product (synthesized by suspending melamine in formalin in a ratio of 3 moles of formaldehyde per mole of melamine and heating at 80°C. for 20 minutes). To the resulting solution was added 0.454 g of cupric acetate (corresponding to 1 mole per 100 hydroxy groups in PVA which is referred to hereinafter as Cu/OH = 1/100) and uniformly dissolved. The resulting solution was admixed with 500 g of calcined gypsum, stirred for 2 minutes by means of a mixer, poured into a mold, and allowed to harden. In Table 1 are shown properties of the hardened article which had been dried at 60°C. for 48 hours.

EXAMPLE 2

In 500 ml of water were dissolved 10 g of the PVA used in Example 1 and 5 g (solids) of a melamine-formaldehyde resin emulsion (prepared by suspending melamine in formalin in a ratio of 3 moles of formaldehyde per mole of melamine and heating at 80°C. for 1 hour). To the resulting solution were added 11 ml of a 5 %-aqueous solution of titanium sulfate (corresponding to Ti/OH= 1/100) and 500 g of calcined gypsum. A molded article was obtained from the mixture according to the procedure mentioned in Example 1. In Table 1 are shown properties of the molded article.

EXAMPLE 3

In 500 ml of water were dissolved 10 g of the same PVA as used in Example 1 and 5 g (solids) of a water-soluble urea-formaldehyde resin (synthesized from a mixture of 1 mole of urea and 1.6 moles of formaldehyde, which had been adjusted to a pH of 7 with sodium hydroxide, by heating at 100°C. for 45 minutes). To the resulting solution were added 11 ml of a 5 %-aqueous solution of titanium sulfate and 500 g of calcined gypsum. A molded article was obtained from the mixture in a manner similar to that in Example 1. In Table 1 are shown properties of the molded article.

EXAMPLE 4

The same procedure as in Example 1 was repeated, except that calcium acetate was substituted for the cupric acetate to obtain a gypsum composition. In Table 1 are shown properties of the molded article.

EXAMPLE 5

The same procedure as in Example 1 was repeated, except that silicon oxide was substituted for the cupric acetate to obtain a gypsum composition. In Table 1 are shown properties of the molded article.

EXAMPLE 6

The same procedure as in Example 1 was repeated, except that magnesium iodide was substituted for the cupric acetate to obtain a gypsum composition. In Table 1 are shown properties of themolded article.

EXAMPLE 7

The same procedure as in Example 1 was repeated, except that aluminum chloride was substituted for the cupric acetate to obtain a gypsum composition. In Table 1 are shown properties of the molded article.

EXAMPLE 8

The same composition as in Example 1 was admixed with 15 g of glass fiber and a molded article was obtained from the mixture. In Table 1 are shown properties of the molded article.

EXAMPLE 9

The same composition as in Example 1, except that stannic chloride was substituted for the cupric acetate, was admixed with 15 g of glass fiber and a molded article was obtained from the mixture. In Table 1 are shown properties of the molded article.

EXAMPLE 10

The same composition as in Example 1 was admixed with 5 g of foamed polystyrene beads and a molded article was obtained from the mixture. In Table 1 are shown properties of the molded article.

EXAMPLE 11

The same procedure as in Example 1 was repeated using 100 g of water, 2 g of 99.4 %-saponified PVA having a degree of polymerization of 1,500, 1 g of the melamine-formaldehyde per-condensation product (the same product as in Example 1), cupric acetate (Cu/OH = 1/100), 2 g (solids) of carboxylated SBR latex (methacrylic acid/styrene/butadiene = 5/25/70 by weight) and 100 g of calcined gypsum to obtain a gypsum composition. The results of tests on physical properties of the gypsum composition were as shown in Table 1.

EXAMPLE 12

The same procedure as in Example 1 was repeated, using 100 g of water, 3 g of an emulsion of a graft-polymer of methyl methacrylate on 99.4 %-saponified PVA having a degree of polymerization of 1,500 (the vinyl alcohol/methyl methacrylate molar ratio being 1), 1 g of the melamine-formaldehyde pre-condensation product (the same product as in Example 1), stannic chloride (Sn/OH = 1/100) and 100 g of calcined gypsum to obtain a gypsum composition. The results of tests on physical properties thereof were as shown in Table 1.

EXAMPLE 13

The same procedure as in Example 11 was repeated, except that 1 g (solids) of an NBR latex (acrylonitrile/butadiene = 35/65 by weight) was substituted for the carboxylated SBR latex and aluminum chloride (corresponding to Al/OH = 1/200) was substituted for the cupric acetate, to obtain a gypsum composition. The results of tests on physical properties were as shown in Table 1.

In Examples 11 and 13, it was found that the nail- and wood screw-holdability was improved.

Referential Example 1

In a manner similar to that in Example 1, a gypsum molded article was prepared from 15 g of PVA, 0.454 g of cupric acetate, 500 g of calcined gypsum, and 500 ml of water. The test results of properties of the article were as shown in Table 1.

Referential Example 2

In a manner similar to that in Example 1, a gypsum molded article was prepared from 10 g of PVA, 5 g of melamine-formaldehyde resin ("Sumirez Resin 613", produced by Sumitomo Chemical Co.), 500 g of calcined gypsum, and 500 ml of water. The test results of properties of the article were as shown in Table 1.

Table 1

| Example No. | Specific gravity | Compressive strength (kg/cm²) | Flexural strength (kg/cm²) | Surface hardness (pencil) | Water absorption (%) | Surface hardness after immersion* | Change in appearance after immersion in water at 20°C. for 1 hour |
|---|---|---|---|---|---|---|---|
| 1 | 0.90 | 102 | 85 | 8H | 4 | 2H | None |
| 2 | 0.90 | 99 | 87 | 8H | 6 | 2H | None |
| 3 | 0.90 | 100 | 84 | 8H | 7 | 2H | None |
| 4 | 0.90 | 110 | 90 | 9H | 4 | 3H | None |
| 5 | 0.90 | 100 | 85 | 8H | 3 | 2H | None |
| 6 | 0.90 | 98 | 85 | 8H | 5 | 2H | None |
| 7 | 0.90 | 95 | 86 | 8H | 5 | 2H | None |
| 8 | 1.20 | 150 | 110 | 9H | 3 | 2H | None |
| 9 | 1.20 | 155 | 100 | 8H | 4 | 2H | None |
| 10 | 0.60 | 60 | 70 | 4H | 5 | B | None |
| 11 | 0.85 | 108 | 85 | 7H | 2 | 2H | None |
| 12 | 0.90 | 120 | 91 | 8H | 3 | 3H | None |
| 13 | 0.90 | 123 | 88 | 8H | 2 | 3H | None |
| Ref. 1 | 0.90 | 80 | 70 | 6H | 50 | 6B | Swell-up |
| Ref. 2 | 0.90 | 45 | 50 | 3H | 50 | 6B | Bleeding of PVA |

What we claim is:

1. A gypsum composition obtained by molding and drying an aqueous slurry comprising 100 parts by weight of calcined gypsum, 0.1 to 50 parts by weight of at least one polyvinyl alcohol having a degree of saponification of at least 50 mole percent, 0.1 to 50 parts by weight of at least one thermosetting resin, and 0.001 to 1 mole per hydroxyl group in the polyvinyl alcohol of at least one metal compound which forms a chelated bond with the hydroxyl group.

2. A composition according to claim 1, wherein the polyvinyl alcohol is selected from the group consisting of saponification products of polyvinyl formate, acetate or propionate having a degree of saponification of at least 50 mole percent, saponification products of copolymers of vinyl formate, acetate or propionate and a vinylic monomer copolymerizable therewith having a degree of saponification of at least 50 mole percent, acetalized saponification products of polyvinyl formate, acetate or propionate having a degree of saponification of at least 50 mole percent, the degree of acetalization of which is up to 15 mole percent, and graft-copolymers of a vinylic or conjugated diene monomer on saponification products of polyvinyl formate, acetate or propionate having a degree of saponification of at least 50 mole percent, the proportion of the vinylic or conjugated diene monomer being up to 5 moles per one vinyl alcohol unit in the saponification product.

3. A composition according to claim 2, wherein the copolymers are those of vinyl formate, acetate or propionate and acrylonitrile, acrylic acid, maleic anhydride, methyl methacrylate, 2-hydroxyethyl acrylate, or glycidyl methacrylate, and the graft copolymers are those of acrylonitrile, acrylic acid, methyl methacrylate, 2-hydroxyethyl acrylate, glycidyl methacrylate, or chloroprene on the saponification product of polyvinyl formate, acetate or propionate.

4. A composition according to claim 1, wherein the amount of the metal compound is 0.004 to 0.1 mole per one hydroxyl group in the polyvinyl alcohol.

5. A composition according to claim 1, wherein the amount of the thermosetting resin is 0.5 to 20 parts by weight per 100 parts by weight of the calcined gypsum.

6. A composition according to claim 1, wherein the amount of water in the aqueous slurry is 50 to 120 parts by weight per 100 parts by weight of the calcined gypsum.

7. A composition according to claim 1, wherein the thermosetting resin is selected from a condensation product of melamine and formaldehyde, a condensation product of a urea and formaldehyde, a condensation product of a phenol and formaldehyde, and a condensation product of a guanamine and formaldehyde, and derivatives thereof.

8. A composition according to claim 1, wherein the metal compound is selected from the group consisting of compounds of metals of Groups Ib, II, IIIa, IV, Vb, VIb, VIIb and VIII of the Periodic Table.

9. A composition according to claim 8, wherein the metal is selected from the group consisting of copper, calcium, magnesium, zinc, aluminum, silicon, tin, titanium, zirconium, vanadium, chromium, molybdenum, manganese, iron, and nickel.

10. A composition according to claim 8, wherein the metal is selected from the group consisting of calcium, magnesium, aluminum, silicon, tin and titanium.

11. A composition according to claim 8, wherein the metal compound is selected from the group consisting of a sulfate, nitrate, carbonate, acetate, halide, hydroxide and oxide.

12. A composition according to claim 1, wherein the metal compound is selected from the group consisting of copper acetate, copper nitrate, copper sulfate, copper bromide, copper iodide, magnesium iodide, calcium acetate, strontium nitrate, barium oxide, zinc acetate, zinc chloride, cadmium fluoride, mercuric acetate, aluminum chloride, aluminum sulfate, silicon oxide, stannous chloride, stannic chloride, stannous sulfate, lead acetate, titanium sulfate, titanium hydroxide, zirconium oxychloride, vanadium trichloride, vanadium pentoxide, niobium chloride, chromous chloride, potassium dichromate, molybdenum oxide, tungstic acid, manganese chloride, manganese dioxide, manganese acetate, ferrous chloride, ferric chloride, ferric nitrate, cobaltous sulfate, cobalt acetate, nickel chloride, and nickel acetate.

13. A composition according to claim 1, wherein the metal compound is selected from the group consisting of calcium acetate, magnesium iodide, aluminum chloride, aluminum sulfate, silicon oxide, stannous chloride, stannic chloride and titanium sulfate.

14. A composition according to claim 1, wherein the aqueous slurry contains an acid or an amine.

15. A composition according to claim 14, wherein the acid or amine is hydrogen halide, sulfuric acid, nitric acid, formic acid, chloroacetic acid, benzenesulfonic acid, p-toluenesulfonic acid, ammonia, pyridine, pyrrole, triethylenediamine, dimethylamine or diethylamine.

16. A composition according to claim 1, wherein the aqueous slurry contains a synthetic fiber, natural fiber, cellulose, or an inorganic fiber.

17. A composition according to claim 1, wherein the amount of the fiber is 0.5 to 10 parts by weight per 100 parts by weight of the calcined gypsum.

18. A composition according to claim 1, wherein the aqueous slurry contains a density-reducing material selected from the foamed polystyrene beads, "Shirasu" balloon, perlite and wood flour in a proportion of 0.5 to 200 parts by weight per 100 parts by weight of the calcined gypsum.

19. A composition according to claim 1, wherein the aqueous slurry contains a filler selected from "Shirasu," powdered glass, clay and powdered polyvinyl alcohol in a proportion of 0.5 to 200 parts by weight per 100 parts by weight of the calcined gypsum.

20. A composition according to claim 1, wherein the aqueous slurry contains at least one polymer latex selected from SBR latex, NBR latex, natural rubber latex, polyvinyl acetate latex, ethylene-vinyl acetate copolymer latex, polyvinyl chloride latex, polystyrene latex, and their carboxyl-containing polymer latexes, in a proportion of 0.1 to 50 parts by weight per 100 parts by weight of the calcined gypsum.

* * * * *